United States Patent
Bergström et al.

(10) Patent No.: US 10,321,363 B2
(45) Date of Patent: Jun. 11, 2019

(54) RADIO NETWORK NODES AND METHODS FOR ENABLING MOBILITY BETWEEN SAID NODES

(71) Applicant: Telefonaktiebolaget LM Ericsson (publ), Stockholm (SE)

(72) Inventors: Andreas Bergström, Vikingstad (SE); Pradeepa Ramachandra, Linköping (SE); Peter Alriksson, Hörby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 53 days.

(21) Appl. No.: 15/527,092

(22) PCT Filed: Sep. 2, 2015

(86) PCT No.: PCT/SE2015/050925
§ 371 (c)(1),
(2) Date: May 16, 2017

(87) PCT Pub. No.: WO2017/039504
PCT Pub. Date: Mar. 9, 2017

(65) Prior Publication Data
US 2017/0367014 A1  Dec. 21, 2017

(51) Int. Cl.
*H04W 36/00* (2009.01)
*H04B 7/06* (2006.01)
(Continued)

(52) U.S. Cl.
CPC ...... *H04W 36/0055* (2013.01); *H04B 7/0619* (2013.01); *H04B 7/0695* (2013.01);
(Continued)

(58) Field of Classification Search
CPC ...... H04B 7/0619; H04B 7/0695; H04B 7/06; H04W 36/0055; H04W 36/00; H04W 64/00; H04W 16/28
(Continued)

(56) References Cited

U.S. PATENT DOCUMENTS 9,629,171 B2 *  4/2017  Roy ............... H04W 16/28
9,681,448 B2 *  6/2017  Centonza ......... H04W 72/044
(Continued)

FOREIGN PATENT DOCUMENTS

EP  2874437 A1  5/2015
WO  9638015 A1  11/1996
(Continued)

OTHER PUBLICATIONS

Author Unknown, "Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," Technical Specification 36.300, Version 12.4.0, 3GPP Organizational Partners, Dec. 2014, 251 pages.
(Continued)

*Primary Examiner* — Man U Phan
(74) *Attorney, Agent, or Firm* — Withrow & Terranova, PLLC

(57) ABSTRACT

Embodiments herein relate to a method performed by a first radio network node for enabling a mobility procedure of a wireless device between the first radio network node and a second radio network node in a wireless communication network. The first radio network node transmits a first indication to the second radio network node, which first indication indicates a position of the wireless device. The first radio network node further receives a second indication from the second radio network node, which second indica-
(Continued)

tion indicates one or more beams used at the second radio network node. The first radio network node sends to the wireless device measurement information indicating the one or more beams to perform measurement on and thereby enabling the mobility procedure.

26 Claims, 7 Drawing Sheets

(51) Int. Cl.
*H04W 16/28* (2009.01)
*H04W 64/00* (2009.01)

(52) U.S. Cl.
CPC .......... *H04W 16/28* (2013.01); *H04W 36/00* (2013.01); *H04W 36/0058* (2018.08); *H04W 64/00* (2013.01)

(58) Field of Classification Search
USPC ......................................................... 370/331
See application file for complete search history.

(56) References Cited

U.S. PATENT DOCUMENTS

| 9,686,695 | B2* | 6/2017 | Subramanian | ........ H04W 16/28 |
| 9,713,129 | B2* | 7/2017 | Cordeiro | .............. H04W 16/32 |
| 9,743,330 | B2* | 8/2017 | Shukair | ............... H04W 36/165 |
| 9,768,847 | B2* | 9/2017 | Frenger | ................ H04B 7/0617 |
| 9,867,091 | B2* | 1/2018 | Jo | ......................... H04W 16/28 |
| 9,961,565 | B2* | 5/2018 | Roy | ...................... H04W 16/28 |
| 2013/0083774 | A1 | 4/2013 | Son et al. | |
| 2013/0337822 | A1 | 12/2013 | Rubin et al. | |
| 2014/0073337 | A1 | 3/2014 | Hong et al. | |
| 2015/0045048 | A1 | 2/2015 | Xu et al. | |
| 2016/0044518 | A1* | 2/2016 | Centonza | .............. H04W 24/02 370/328 |
| 2016/0337916 | A1* | 11/2016 | Deenoo | ................... H04W 8/22 |
| 2018/0152869 | A1* | 5/2018 | Cedergren | ........... H04B 7/0408 |
| 2018/0199220 | A1* | 7/2018 | Reial | ....................... H04W 8/02 |

FOREIGN PATENT DOCUMENTS

| WO | 2014036150 A1 | 3/2014 |
| WO | 2015109153 A1 | 7/2015 |

OTHER PUBLICATIONS

Author Unknown, "Technical Specification Group Radio Access Network; Evolved Universal Terrestrial Radio Access (E-UTRA); Radio Resource Control (RRC); Protocol specification (Release 12)," Technical Specification 36.331, Version 12.4.1, 3GPP Organizational Partners, Dec. 2014, 410 pages.
Sung, Nak Woon et al., "Contention Based Fast Beam Switching Scheme in Millimeter-wave Cellular Systems," 17th International Conference on Advanced Communication Technology (ICACT), Jul. 1-3, 2015, Seoul, South Korea, IEEE, pp. 502-505.
International Search Report and Written Opinion for International Patent Application No. PCT/SE2015/050925, dated May 10, 2016, 16 pages.
Supplementary European Search Report for European Patent Application No. 15903154.1, dated Aug. 8, 2018, 3 pages.

* cited by examiner

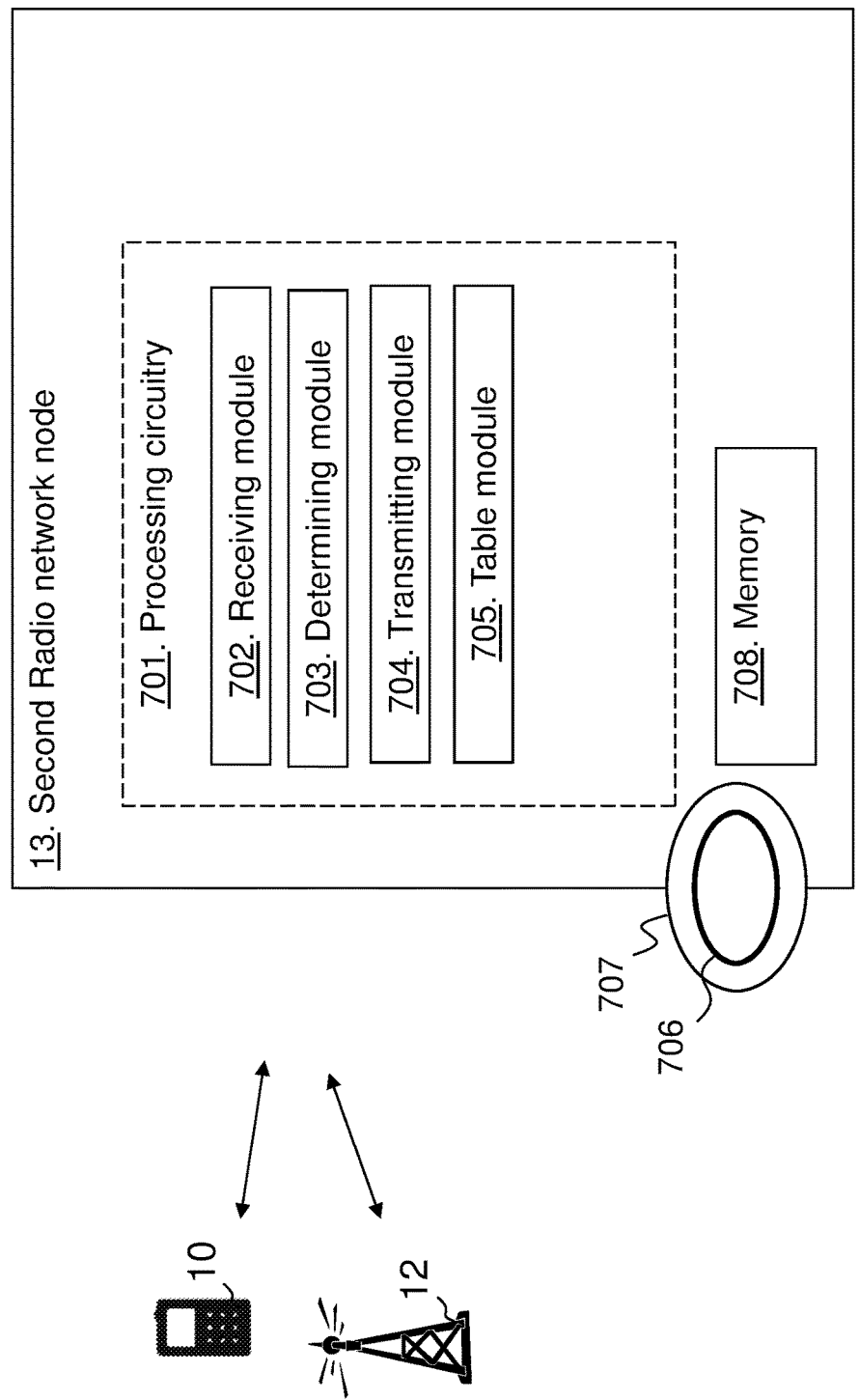

RADIO NETWORK NODES AND METHODS FOR ENABLING MOBILITY BETWEEN SAID NODES

This application is a 35 U.S.C. § 371 national phase filing of International Application No. PCT/SE2015/050925, filed Sep. 2, 2015, the disclosure of which is incorporated herein by reference in its entirety.

TECHNICAL FIELD

Embodiments herein relate to a first radio network node, a second radio network node and methods performed therein in a wireless communication network. In particular, embodiments herein relate to enabling a mobility procedure of a wireless device between the first radio network node and the second radio network node in the wireless communication network.

BACKGROUND

In a typical wireless communication network, wireless devices, also known as wireless communication devices, mobile stations, stations (STA) and/or user equipments (UEs), communicate via a Radio Access Network (RAN) to one or more core networks. The RAN covers a geographical area which is divided into service areas or cell areas, with each service area or cell area being served by a radio network node such as a radio access node e.g., a Wi-Fi access point or a radio base station (RBS), which in some networks may also be denoted, for example, a "NodeB" or "eNodeB". The service area or cell area is a geographical area where radio coverage is provided by the radio access node. The radio access node communicates over an air interface operating on radio frequencies with the wireless device within range of the radio access node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks and UTRAN specifically, and investigate enhanced data rate and radio capacity. In some RANs, e.g. as in UMTS, several radio access nodes may be connected, e.g., by landlines or microwave, to a controller node, such as a radio network controller (RNC) or a base station controller (BSC), which supervises and coordinates various activities of the plural radio access nodes connected thereto. This type of connection is sometimes referred to as backhaul connection. The RNCs are typically connected to one or more core networks.

Specifications for the Evolved Packet System (EPS) have been completed within the 3$^{rd}$ Generation Partnership Project (3GPP) and this work continues in the coming 3GPP releases. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access technology wherein the radio access nodes are directly connected to the EPC core network rather than to RNCs. In general, in E-UTRAN/LTE the functions of an RNC are distributed between the radio access nodes, e.g. eNodeBs in LTE, and the core network. As such, the Radio Access Network (RAN) of an EPS has an essentially "flat" architecture comprising radio access nodes connected directly to one or more core networks, i.e. they are not connected to RNCs. To compensate for that, the E-UTRAN specification defines a direct interface between the radio access nodes, this interface being denoted the X2 interface.

Of the upcoming fifth generation of wireless communication networks 5G, one key design principle currently under consideration is to base the wireless communication network on an ultra-lean design. This implies that "always on signals" from the network should be avoided as much as possible. The expected benefits from this design principle are that the wireless communication network should have a significantly lower network energy consumption, a better scalability, a higher degree of forward compatibility during the radio access technology (RAT) evolution phase, a lower interference from system overhead signals and consequently a higher throughput in low load scenario, and an improved support for user centric beam-forming.

There are principally two sets of mobility procedures considered in both the current LTE standard as well as in the ongoing 5G discussions.

The first one is denoted 'Idle Mode Mobility' and defines how a wireless device which is deemed 'Idle', i.e. the wireless device has no ongoing nor recent data transfer, shall be able to reach the wireless communication network using random access procedures and how to be reachable from the wireless communication network by means of paging procedures etc. In idle mode, the mobility procedures, e.g. handovers or cell selections, are typically controlled by the wireless device based on a set of rules, e.g. signal level thresholds and carrier frequency priorities, decided by the wireless communication network.

The other one is 'Active Mode Mobility', which has a main task of maintaining the connectivity for an 'Active' or 'Connected' wireless device, i.e. the wireless device actually has an ongoing or recent data transfer, as the wireless device moves around in the wireless communication network, and also to handle abnormal cases such as failed handovers, radio link failures etc. In 'Active Mode Mobility' the mobility procedures are typically controlled by the wireless communication network, potentially based on measurements from the wireless device.

A complete X2-based intra-Mobility Management Entity (MME)/intra Serving Gateway (S-GW) Handover (HO) procedure for an LTE system is given in 3GPP TS 36.300 "E-UTRA(N) Overall Description; Stage 2" version: V12.4.0 (2014-12).

A key difference between the current LTE procedures as per above, and the upcoming 5G procedures, is that in an ultra-lean system as 5G, as described above, the radio network nodes will prevent themselves from keeping some of the 'always-on' signal unlike their counter parts in the LTE system. Instead, the wireless communication network needs to activate the necessary reference signals/beams to measure on only when needed.

The term 'beam' used herein is defined in relation with a reference signal (RS). That is, from the wireless device's standpoint a beam is considered as an entity that the wireless device may associate with and is recognized via some reference signals specific to that beam which, in the case of a legacy LTE network may be the Cell-specific Reference Signals (CRS) of the cell or wireless device specific reference signals for a specific wireless device. In a wireless communication network with more than one antenna, it is possible for the wireless communication network to form directive antenna radiation patterns, a process which is most often related to as 'beam-forming'. In future wireless communication systems with a large number of antennas, this beam-forming may be very directive and hence provide a very high antenna beamforming gain. In such beam-forming cases, there may be other types of reference signals present, here called simply Beam Reference Signals (BRS) or Mobility Reference Signals (MRS). In all essence however, regardless of the level of directivity of the formed antenna pattern, it is still considered a 'beam'. Hence, for the simplicity of the exposition, the term 'beam' will be used herein.

A service area of a radio network node is a region surrounding the radio network node in which the radio network node is responsible for the active mode mobility related measurements from the wireless device. A wireless device outside such a service area could still be served by the beams from the radio network node but a neighbor radio network node providing radio coverage will be ideally suited for mobility related aspects for the wireless device. Also, such a service area could be a virtual region or could be defined by certain reference signals' coverage. Hence, this 5G concept of service area could be resembled to the coverage area/cell concept of a current LTE system, which has no counterpart in a massively beam-formed system without cell-specific reference symbols being always on.

The mobility procedures also referred to as the handover or cell selection procedures as described above may be refined further in a scenario where it is not certain that a potential target eNB is transmitting the relevant reference signals corresponding e.g. to a given beam, which is assumed in the legacy case above. In such case, a request to start transmitting these reference signals is required, which could e.g. as per FIG. 1, where a serving eNB, eNB1, at an early stage, based on some logic not shown here, requests, with a reference signal request, a potential target eNB, eNB2, to start transmitting one or more RSs or beams that can be used for HO related measurements by the wireless device to support the HO procedure, see action 1a. The eNB2 starts the RSs or beams, action 1b in the FIG. 2. Action 1c. The eNB1 sends the wireless device, W1, some measurement control information for enabling measurements. Action 2. The wireless device W1 reports back to the eNB1 with measurement reports. Action 3. The eNB1 makes a HO decision based on the received measurement reports. In case a HO is decided, the eNB1 transmits a handover request to the eNB2, see Action 4. Action 5. The eNB2 performs an admission control and in case the admission control is successful, the eNB2 sends a handover request acknowledgement (Ack) to the eNB1, see Action 6.

The underlying assumption here is that the serving eNB, eNB1, keeps track of which reference signals, i.e. beams, that are to be started in action 1b in FIG. 1 above based on a position of a considered wireless device together with a lookup in a position-to-beam mapping table containing beams also in other radio network nodes than itself. The end result being that the eNB1 will indicate explicitly to the eNB2 exactly which reference signals/beams it wants the eNB2 to start transmitting.

Now, keeping this position-to-beam mapping table in an optimal state—i.e. where exactly those beams that are usable for a given position, but no others, are mapped to that position—is rather difficult. If not done properly, it may end up so that too many beams are started resulting in a waste of resources and extra interference, or too few beams are started resulting in a failure to find the best beam and risk ending up in a sub-optimal allocation. Furthermore, it could be quite complex to establish an initial position-to-beam mapping table for the initial times—especially with regards to entries in the position-to-beam mapping table relating to other radio network nodes. Also, it could be so that there are time variations on which beams are best at a given position, hence this position-to-beam mapping table would need another dimension, e.g. time, which would make such a solution even more complex. Thus, a problem with present solutions is that resources may be wasted or that a beam that is not the optimal may be used resulting in a limited performance of the wireless communication network.

SUMMARY

An object of embodiments herein is to provide a mechanism that improves performance of the wireless communication network.

According to an aspect the object is achieved by a method performed by a first radio network node for enabling a mobility procedure of a wireless device between the first radio network node and a second radio network node in a wireless communication network. The first radio network node transmits a first indication to the second radio network node, which first indication indicates a position of the wireless device. The first radio network node receives a second indication from the second radio network node, which second indication indicates one or more beams used at the second radio network node. The first radio network node sends to the wireless device, measurement information indicating the one or more beams to perform measurement on and thereby enabling the mobility procedure.

According to another aspect the object is achieved by a method performed by a second radio network node for enabling a mobility procedure of a wireless device between a first radio network node and the second radio network node in a wireless communication network. The second radio network node receives a first indication from the first radio network node, which first indication indicates a position of the wireless device. The second radio network node determines one or more beams to use based on the indicated position of the wireless device. The second radio network node then transmits a second indication to the first radio network node, which second indication indicates the determined one or more beams.

According to yet another aspect the object is achieved by providing a first radio network node for enabling a mobility procedure of a wireless device between the first radio network node and a second radio network node in a wireless communication network. The first radio network node is configured to transmit a first indication to the second radio network node, which first indication indicates a position of the wireless device. The first radio network node is further configured to receive a second indication from the second radio network node, which second indication indicates one or more beams used at the second radio network node. The first radio network node is also configured to send to the wireless device measurement information indicating the one or more beams to perform measurement on and thereby enabling the mobility procedure.

According to still another aspect the object is achieved by providing a second radio network node for enabling a mobility procedure of a wireless device between a first radio network node and the second radio network node in a wireless communication network. The second radio network node is configured to receive a first indication from the first radio network node, which first indication indicates a position of the wireless device. The second radio network node is further configured to determine one or more beams to use based on the indicated position of the wireless device. In addition, the second radio network node is configured to transmit a second indication to the first radio network node, which second indication indicates the determined one or more beams.

An advantage of embodiments herein is that it is the second radio network node controlling the beams that determines which beam/s to use based on the indicated position. Thus changing conditions within a service area of the second radio network node may easily be overcome replacing preferred beams for a certain position. Thus, embodiments herein achieve an improved identification of beam/s to use for the wireless device resulting in an improved performance of the wireless communication network.

BRIEF DESCRIPTION OF THE DRAWINGS

Embodiments will now be described in more detail in relation to the enclosed drawings, in which:

FIG. 7 is a block diagram depicting a first radio network node according to embodiments herein.

DETAILED DESCRIPTION

Figure 1:
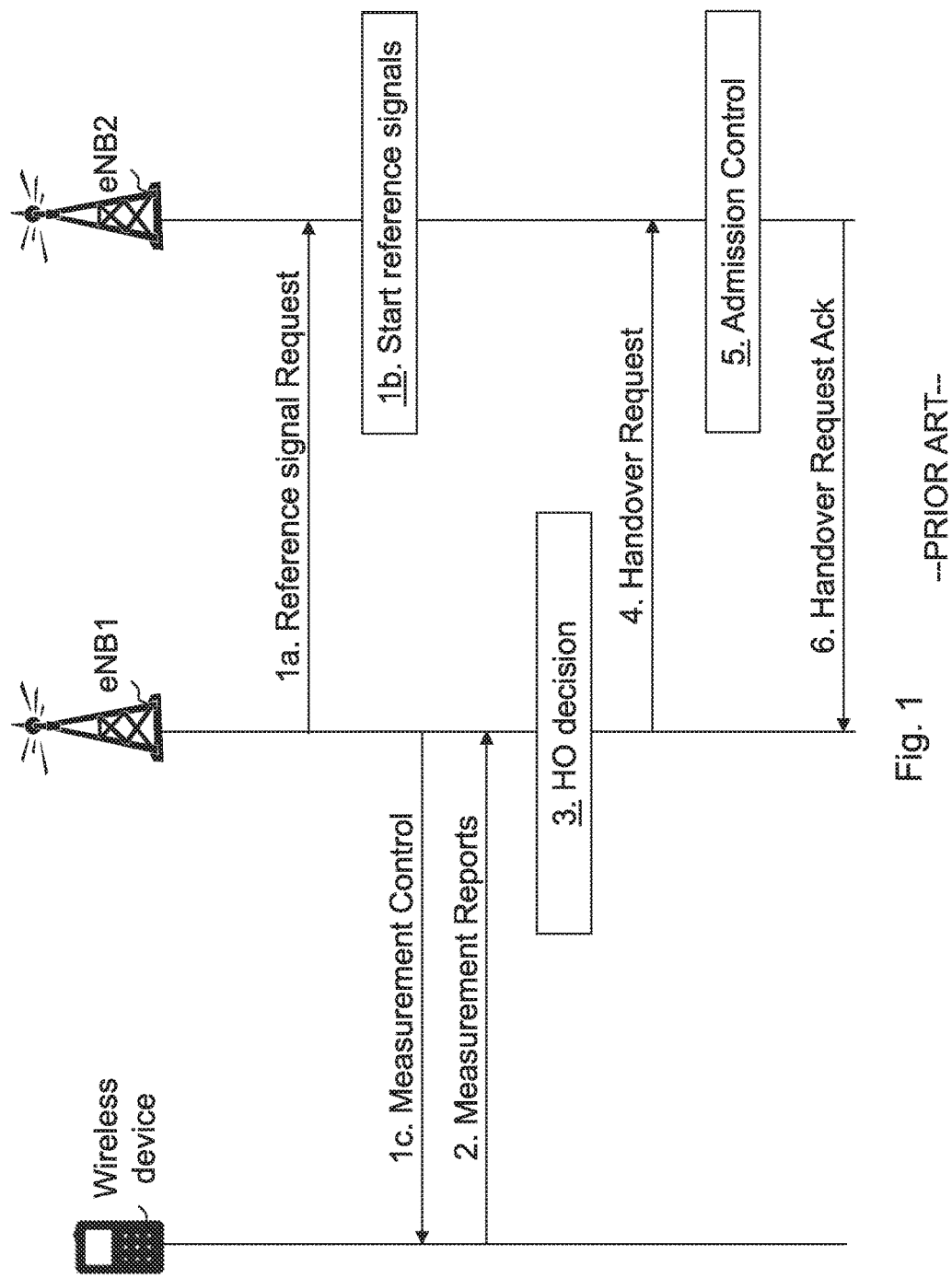
FIG. 1 is a combined signalling scheme and flowchart depicting a method according to prior art.
Figure 2:
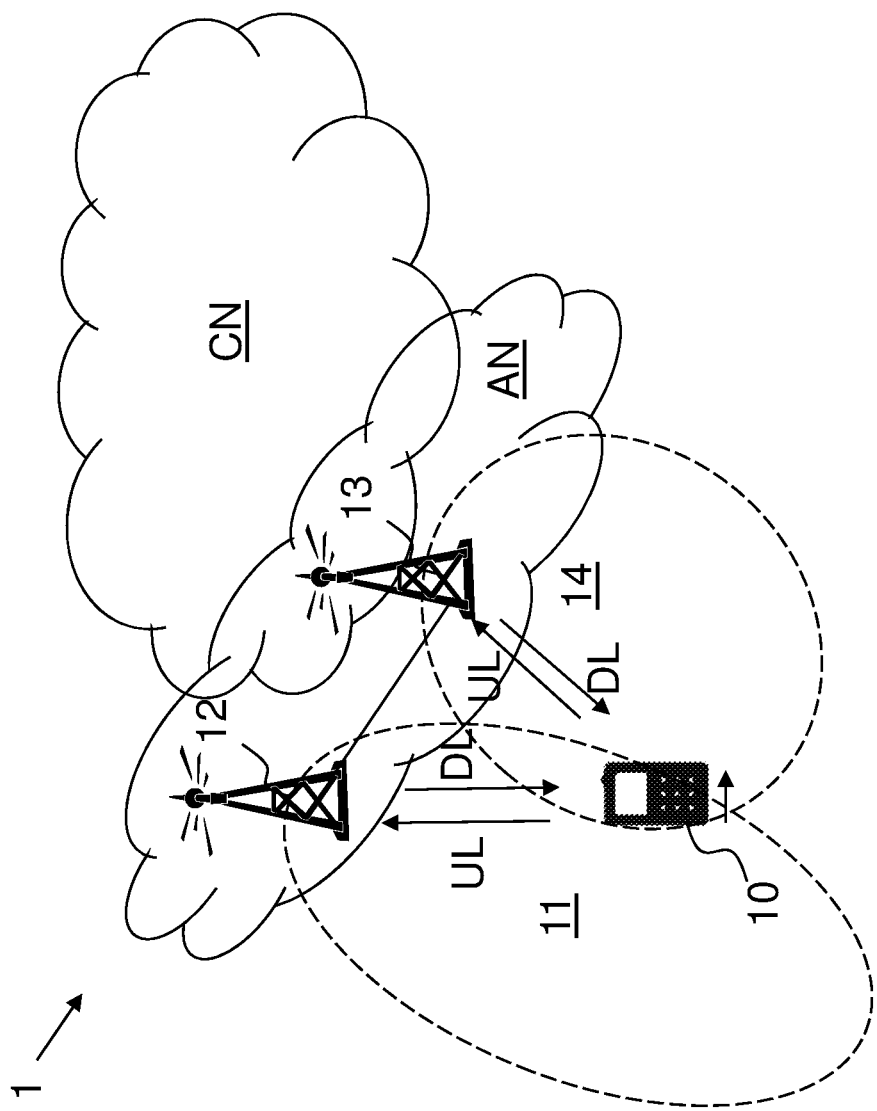
FIG. 2 is a schematic overview depicting a wireless communication network according to embodiments herein.

Embodiments herein relate to wireless communication networks in general. FIG. 2 is a schematic overview depicting a wireless communication network 1. The wireless communication network 1 comprises one or more RANs and one or more CNs. The wireless communication network 1 may use a number of different technologies, such as Wi-Fi, Long Term Evolution (LTE), LTE-Advanced, 5G, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are applicable also in further development of the existing wireless communication systems such as e.g. WCDMA and LTE.

In the wireless communication network 1, wireless devices e.g. a wireless device 10 such as a mobile station, a non-access point (non-AP) STA, a STA, a user equipment and/or a wireless terminals, communicate via one or more Access Networks (AN), e.g. RAN, to one or more core networks (CN). It should be understood by those skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a base station communicating within a cell.

The wireless communication network 1 comprises a first radio network node 12 providing radio coverage over a geographical area, a first service area 11, of a first radio access technology, such as LTE, Wi-Fi or similar. The first radio network node 12 may be a radio network node such as an access point such as a Wireless Local Area Network (WLAN) access point or an Access Point Station (AP STA), an access controller, a base station, e.g. a radio base station such as a NodeB, an evolved Node B (eNB, eNodeB), a base transceiver station, Access Point Base Station, base station router, a transmission arrangement of a radio base station, a stand-alone access point or any other network unit capable of communicating with a wireless device within the service area served by the first radio network node 12 depending e.g. on the first radio access technology and terminology used. The first radio network node 12 may be referred to as source radio network node.

Furthermore, the wireless communication network 1 comprises a second radio network node 13 providing radio coverage over a geographical area, a second service area 14, of a second radio access technology, such as LTE, Wi-Fi, WiMAX or similar. The second radio network node 13 may be a radio network node such as an access point such as a WLAN access point or an Access Point Station (AP STA), an access controller, a base station, e.g. a radio base station such as a NodeB, an evolved Node B (eNB, eNodeB), a base transceiver station, Access Point Base Station, base station router, a transmission arrangement of a radio base station, a stand-alone access point or any other network unit capable of communicating with a wireless device within the service area served by the second radio network node 13 depending e.g. on the second radio access technology and terminology used. The first and second RAT may be the same or different RATs. The second radio network node 13 may be referred to as target radio network node.

According to embodiments herein the wireless device 10 moves through the wireless communication network 1 and is measuring signal strength that may indicate a HO from the first radio network node 12 to the second radio network node 13. A given radio network node should know better of the current channel conditions in its served service area, e.g. beam conditions etc. than another radio network node can. Hence, according to embodiments herein the first radio network node 12 informs, instead of the first radio network node 12 requesting the second radio network node 13 to activate particular beam/s via a position-to-beam mapping table containing beams of other radio network nodes, a 'position' of the current wireless device 10 to the second radio network node 13. The second radio network node 13 will then decide on an optimal beam in the direction towards the informed position based on its current channel characteristics/knowledge, which may be in form of a position-to-beam mapping table, but only containing entries relating to beams in the second radio network node 13, and thereafter informs the first radio network node 12 on which beams that was actually started.

The position of the wireless device 10 may refer to a geographical position or a so-called 'radio position' of the wireless device 10. The term 'radio position' used here could for example be a set of measured quantities such as angle of arrival or experienced path loss of transmissions from the wireless device 10 or signal strength measurements of transmission to the wireless device 10, in other words a sort of fingerprinting of the radio environment. It could also be based on actively transmitted signals/beacons from some radio network nodes in, or outside, the wireless communication network 1.

Some embodiments herein provide a reduced complexity in the generation or maintenance of table generation at a given radio network node, which table indicates a mapping of position to beams. The table e.g. a position-to-MRS table, in a radio network node may comprise a set of beams transmitted by the same radio network node as well as neighbor radio network nodes that could serve the wireless device 10 in that position. A set of beams may comprise one or more beams.

Embodiments herein provide an improved identification of beams in the second radio network node 13 for the incoming wireless device 10 as the second radio network node 13 knows it's channel characteristics in the direction of the wireless device 10, both in terms of spatial and temporal aspects, more optimally.

Some embodiments herein further allow dynamic changes in the shape of the beams in the second radio network node 13 as any changes in the shape of the beam in the second radio network node 13 does not affect the active mode mobility for the incoming wireless device 10 from some other radio network node, such as the first radio network node 12. This is because of the fact that the beams of the second radio network node 13 may be transparent to the first radio network node 12 since it is the second radio network node 13 that determines which beam or beams to use.

Figure 3:
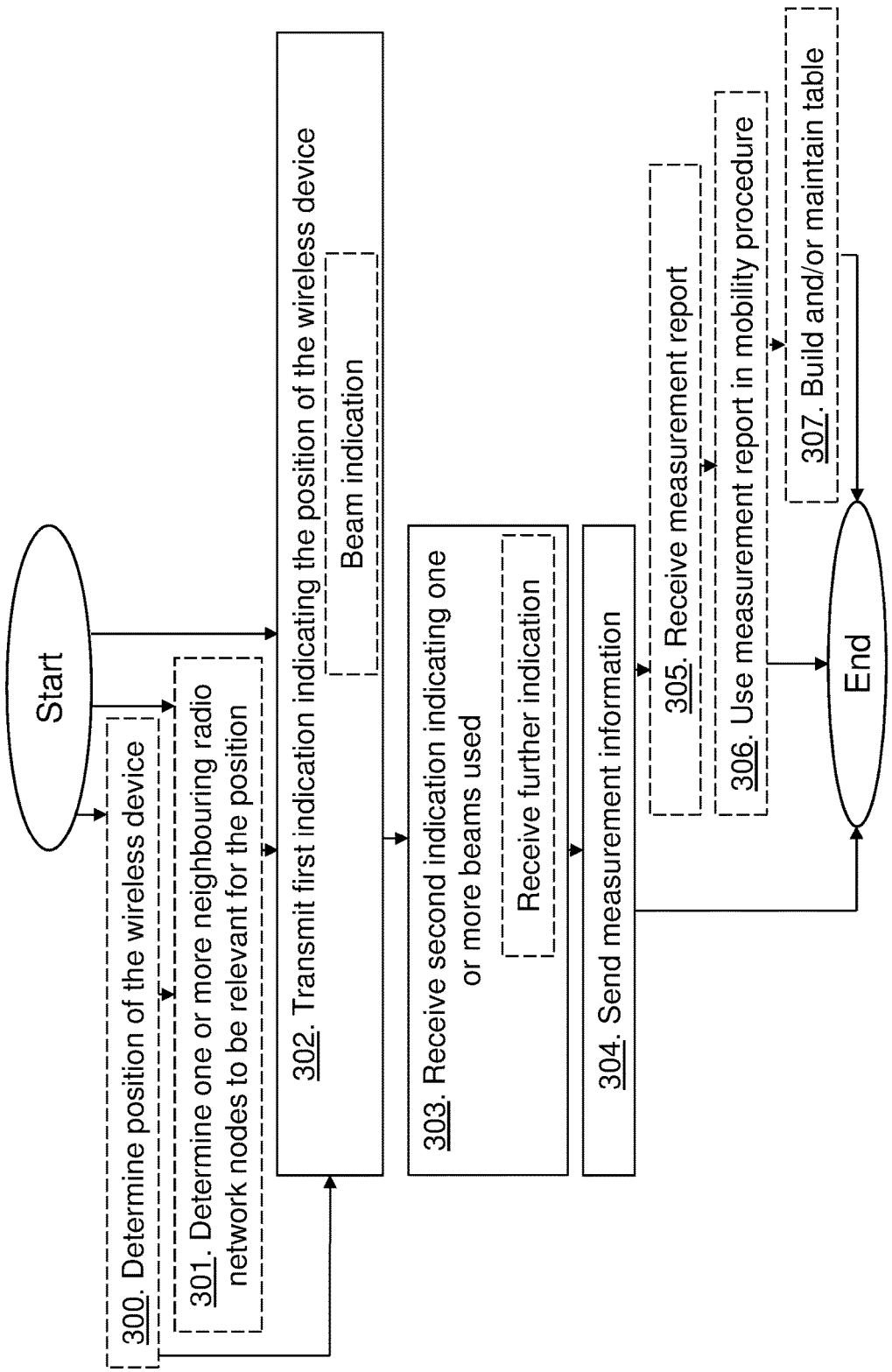
FIG. 3 is a flowchart depicting a method according to embodiments herein.

The method actions performed by the first radio network node for enabling a mobility procedure of the wireless device 10 between the first radio network node 12 and the second radio network node 13 in the wireless communication network 1 according to some embodiments will now be described with reference to a flowchart depicted in FIG. 3. The actions do not have to be taken in the order stated below, but may be taken in any suitable order. Actions performed in some embodiments are marked with dashed boxes.

Action 300. The first radio network node 12 may determine a position of the wireless device 10. Position may relate to a 'true' geographical position which can be given by e.g. Global Positioning System (GPS)/Global Navigation Satellite System (GNSS) measurements, estimated angle and/or distance to the wireless device 10, sensors in the wireless device 10 and similar. Furthermore, a position estimate may be based on which beam is used in the first service area 11 and previous acquired knowledge on the coverage area for this beam. Some kind of fingerprinting may be used to determine position whereby, simply put, the measurement reports from the wireless device 10 and/or measurements, e.g. experienced pathloss, timing advance and angle of arrival, of transmissions of from the wireless device 10 are correlated against previous known measurements-to-position statistical mappings. Presence of other signals such as Bluetooth or 802.11 beacons from devices with a known location may be used to estimate the position of the wireless device 10.

Action 301. The first radio network node 12 may determine one or more neighbouring radio network nodes comprising the second radio network node 13 to be relevant for the position of the wireless device 10. This may be performed by taking a table indicating a mapping of position to beams into account. E.g. the first radio network node 12 may determine one or more neighbouring radio network nodes to be relevant for the position of the wireless device 10 based on a position-MRS table, wherein the MRS are associated with certain radio network nodes.

Action 302. The first radio network node 12 transmits a first indication to the second radio network node 13, which first indication indicates the position of the wireless device 10. The position may be determined at the wireless device 10, see action 300, or obtained from another network node. The first radio network node 12 may further transmit a beam indication indicating one or more suggested beams according to the table indicating the mapping of position to beams. The first radio network node 12 may force the start of particular beams wherein the beam indication may further comprise indications of desired requested beams but also indications of forced requested beams.

Action 303. The first radio network node 12 receives a second indication from the second radio network node 13, which second indication indicates one or more beams used at the second radio network node 13. The first radio network node 12 may further receive a further indication indicating which beams to keep and/or flush at the table indicating a mapping of position to beams at the first radio network node 12.

As an example, assume that the first radio network node 12 transmits position of the wireless device 10 and further also indicates beams A,B,C to be started by the second radio network node 13. Now, it may be so that the second radio network node 13 decides NOT to start beam B which is deemed not relevant at all. Also the second radio network node 13 does NOT start C, which is relevant but at the very moment will e.g. interfere too much with other ongoing activities, but starts D and E that are relevant for the position. Hence the second radio network node 13 may indicate beams A,D,E as started, B as to be flushed in the table of the first radio network node 12, and/or C as to be kept in the table.

Action 304. The first radio network node 12 sends to the wireless device 10 measurement information indicating the one or more beams to perform measurement on and thereby enabling the mobility procedure.

Action 305. The first radio network node 12 may then receive a measurement report from the wireless device 10.

Action 306. The first radio network node 12 may then further use the measurement report in the mobility procedure.

Action 307. The first radio network node 12 may further build and/or maintain the table indicating a mapping of position to beams based on the received measurement report and/or the second indication. E.g. the table may be updated in accordance with feedback, the second indication, from the second radio network node 13. If a certain position x triggers beams A, D, E the first radio network node 12 may store this information.

Figure 4:
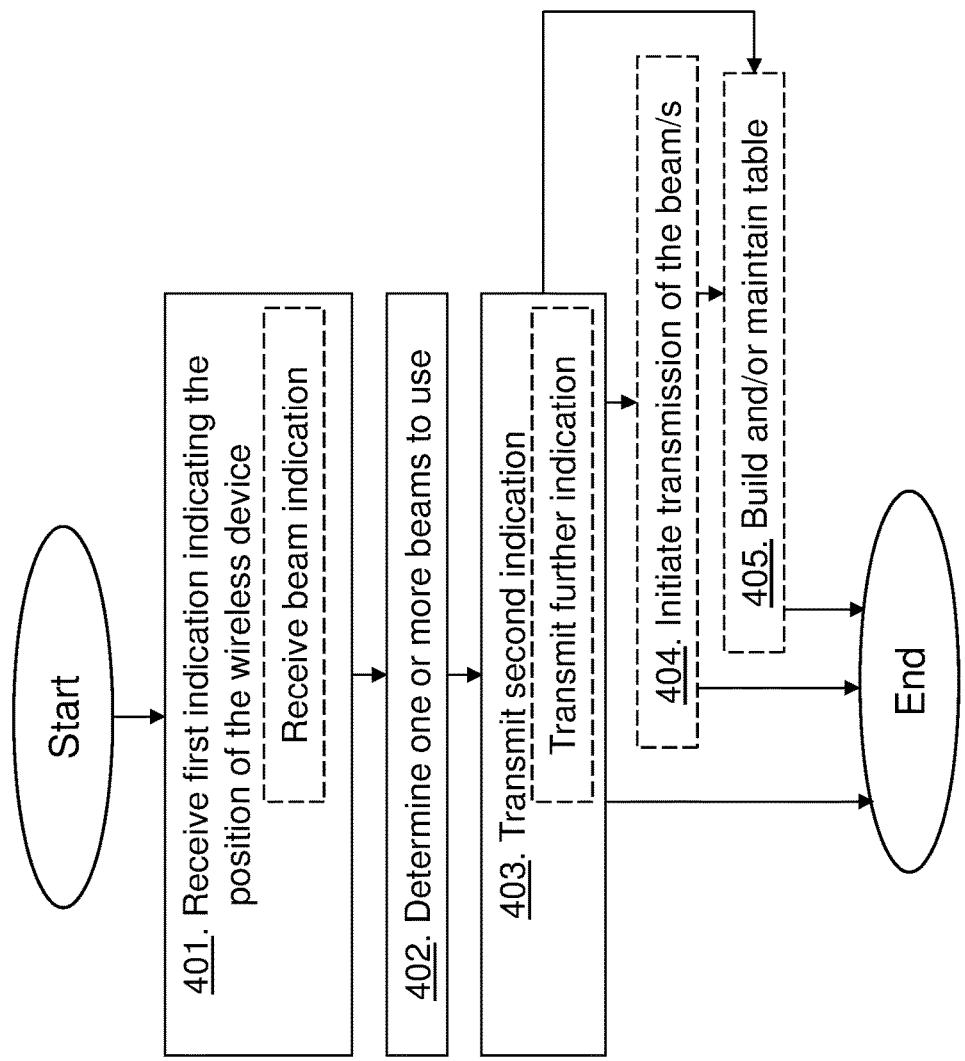
FIG. 4 is a flowchart depicting a method according to embodiments herein.

The method actions performed by the second radio network node 13 for enabling a mobility procedure of the wireless device 10 between the first radio network node 12 and the second radio network node 13 in the wireless communication network 1 according to some embodiments will now be described with reference to a flowchart depicted in FIG. 4. The actions do not have to be taken in the order stated below, but may be taken in any suitable order. Actions performed in some embodiments are marked with dashed boxes.

Action 401. The second radio network node 13 receives the first indication from the first radio network node 12, which first indication indicates the position of the wireless device 10. The first radio network node 12 may further receive a beam indication indicating one or more suggested beams. This may be received in an X2-message.

Action 402. The second radio network node 13 determines one or more beams to use based on the indicated position of the wireless device 10. The second radio network node 13 may take the table indicating the mapping of position to beams into account when determining the one or more beams to use. The second radio network node 13 may further determine the one or more beams to use based on the beam indication, e.g. the beam indication is taken into account when determining the one or more beams to use. The second radio network node 13 may determine the one or more beams to use taking whether a beam is active or not into account. The second radio network node 13 may determine the one or more beams to use taking interference and/or signal strength of different beams into account.

Action 403. The second radio network node 13 transmits the second indication to the first radio network node 12. The second indication indicates the determined one or more beams, e.g. the second indication may indicate a set of beams or explicit beams. The second indication may comprise a further indication indicating which beams to keep and/or flush at the table indicating a mapping of position to beams at the first radio network node 12. The serving first radio network node 12 may explicitly request which beams shall be started from the potential target second radio network node 13 in a request. The potential target second radio network node 13 may choose to start only a subset of the requested beams, or perhaps even beams not included in the requested set, based on the position of the wireless device 10. If so, then the potential target second radio network node 13 shall indicate this to the source second radio network node 13 in a way so that the serving first radio network node 12 knows exactly which beams are initiated. The first radio network node 12 may include information on the 'position' of the wireless device 10 in the message requesting to start the beams sent to the potential target node. The second radio network node 13 will in this scenario itself determine which beams will be initiated, and thereafter communicate which beams were initiated back to the first radio network node 12. The second indication may be transmitted in an X2-message to the first radio network node 12. Information may be e.g. exchanged over backhaul links directly between the radio network nodes, e.g. via X2 or similar, or relayed via the CN, e.g. via S1 or similar, e.g. using a layer protocol as Radio Resource Control (RRC) protocol.

Action 404. The second radio network node 13 may initiate transmission of the one or more beams. E.g. the second radio network node 13 may activate MRS transmissions being beam transmissions or beams.

Action 405. The second radio network node 13 may build and/or maintain the table indicating the mapping of position to beams, or mapping position to beams, based on the received beam indication and/or the determining of the one or more beams to use.

In some embodiments, the first radio network node 12 may include information as per all above embodiments, e.g. the position of the wireless device 10 as well the set of MRSs to be transmitted by the second radio network node 13. The second radio network node 13 may, depending on its own position-to-MRS table, identify the benefit/optimality of the requested beams to the corresponding position. If it is found to be optimal, then the second radio network node 13 may transmit the requested MRSs and may also send the acknowledgement to the request from the first radio network node 12. If on the other hand the mapping of the position-to-MRS table by the second radio network node 13 is found to be non-beneficial/sub-optimal, then the second radio network node 13 identifies the candidate MRSs and informs the first radio network node 12 about the new candidates for the corresponding position of the wireless device 10. In some related embodiments, the first radio network node 12 will then use this information to update its own position-to-MRS table.

Figure 5:
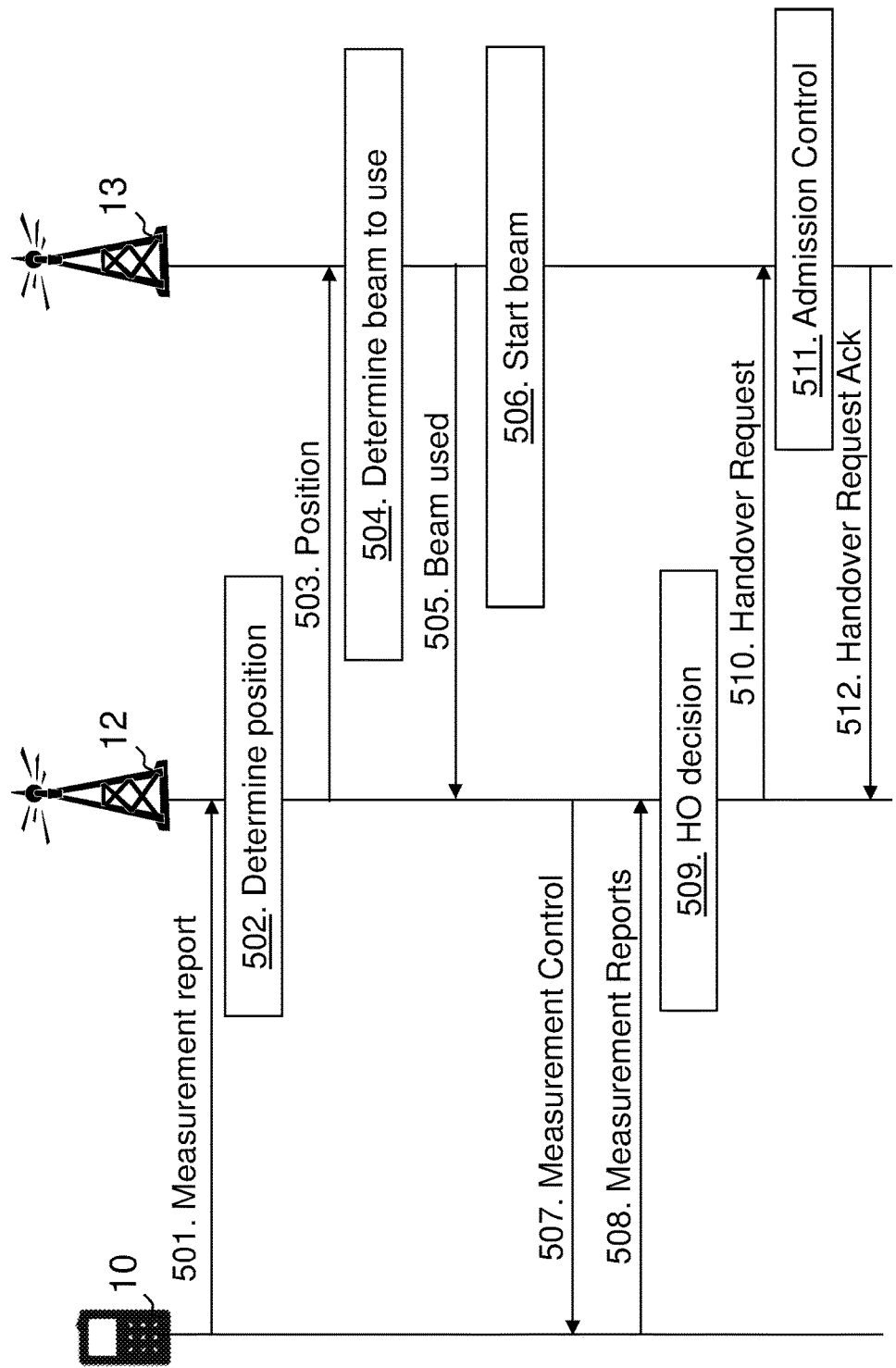
FIG. 5 is a combined signalling scheme and flowchart depicting a method according to embodiments herein.

FIG. 5 is a combined signaling scheme and flowchart according to some embodiments herein.

Action 501. The wireless device 10 transmits measurement reports to the first radio network node 12 serving the wireless device 10. The measurement reports may indicate to initiate a handover procedure or similar.

Action 502. The first radio network node 12 determines position of the wireless device 10. E.g. the first radio network node 12 may receive an indication of handover in the received measurement reports and either from e.g. requesting GPS coordinates from the wireless device 10; or from obtaining the position from within a function tracking the wireless device 10.

Action 503. The first radio network node 12 transmits to the second radio network node 13, the indication indicating the position of the wireless device 10.

Action 504. The second radio network node 13 determines one or more beams to use based on the indicated position e.g. retrieving beams from the table indicating the mapping of position to beams.

Action 505. The second radio network node 13 transmits the second indication to the first radio network node 12. The second indication indicates the one or more beams determined to be used at the second radio network node 13.

Action 506. The second radio network node 13 initiates the transmission of the beam/s i.e. starts transmitting beam/s or reference signals as determined.

Action 507. The first radio network node 12 transmits measurement control to the wireless device 10, i.e. transmits measurement information indicating the one or more beams to perform measurement on and thereby enabling the mobility procedure. Thus, the first radio network node 12 may configure said wireless device 10 to measure on activated beams e.g. on beams from the first radio network node 12 and the second radio network node 13.

Action 508. The wireless device 10 performs measurements and e.g. when a HO trigger is fulfilled, the wireless device 10 transmits a measurement report to the first radio network node 12. The measurement report may indicate signal strength and/or quality of the beam/s of the second radio network node 13 but may also indicate signal strength and/or quality of beam/s from the first radio network node 12.

Action 509. The first radio network node 12 decides whether a mobility procedure such as handover (HO) or cell selection should be performed based on the received measurement report. I.e. the first radio network node 12 may use the measurement report in the mobility procedure.

Action 510. The first radio network node 12 may in case a HO is decided, transmit a handover request to the second radio network node 13.

Action 511. The second radio network node 13 performs an admission control.

Action 512. The second radio network node 13 may in case the admission control is successful, send a handover request acknowledgement (Ack) to the first radio network node 12, and a handover of the wireless device 10 to the second radio network node 13 has been performed.

As already stated, previously a source radio network node informs a neighbour radio network node to transmit particular beams or reference signals when the source radio network node deems it to be relevant. When a wireless terminal is moving towards a service area of the neighbour radio network node from the service area of the source radio network node, based on a position-to-beam table mapping in the source radio network node, the source radio network node may request the neighbour radio network node to transmit one or more beams. At some future point in time, say e.g. 2 hours later, the channel might be very different e.g. higher pathloss or similar. This change might be due to variations in the small cell's coverage region caused by external events such as e.g. a bus might be standing in front of the small cell, a larger amount of external interference, temporary power limitations in that neighbour radio network node etc. According to embodiments herein solves certain scenarios by allowing the second radio network node 13, being a neighbour radio network node, to make the decision to transmit which beam or beams the second radio network node 13 considers to be relevant in the direction of an incoming wireless device 10.

Figure 6:
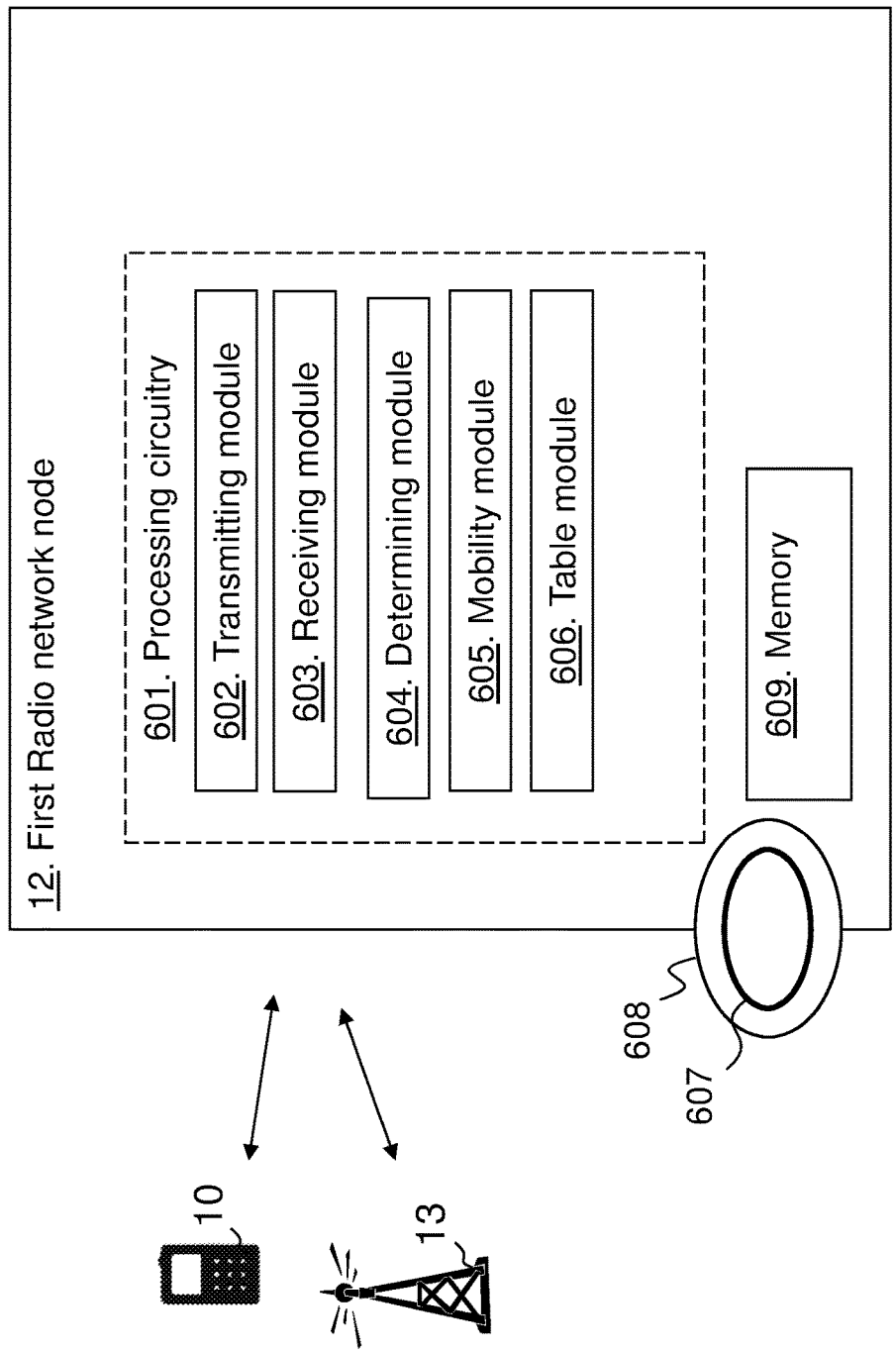
FIG. 6 is a block diagram depicting a second radio network node according to embodiments herein.

In order to perform some methods herein the first radio network node 12 is provided. FIG. 6 is a block diagram depicting the first radio network node 12 for enabling a mobility procedure of the wireless device 10 between the first radio network node 12 and the second radio network node 13 in the wireless communication network. The first radio network node 12 may comprise a processing circuitry 601 configured to perform the methods herein.

The first radio network node 12 is configured to transmit the first indication to the second radio network node 13, which first indication indicates the position of the wireless device 10. The first radio network node 12 may comprise a transmitting module 602. The processing circuitry 601 and/or the transmitting module 602 may be configured to transmit the first indication to the second radio network node 13.

The first radio network node 12 is configured to receive the second indication from the second radio network node 13, which second indication indicates the one or more beams used at the second radio network node 13. The first radio network node 12 may comprise a receiving module 603. The processing circuitry 601 and/or the receiving module 603 may be configured to receive the second indication from the second radio network node 13.

The first radio network node 12 is configured to send to the wireless device 10 measurement information indicating the one or more beams to perform measurement on and thereby enabling the mobility procedure. The processing circuitry 601 and/or the transmitting module 602 may be configured to send to the wireless device 10 measurement information indicating the one or more beams to perform measurement on and thereby enabling the mobility procedure The first radio network node 12 may be configured to determine the position of the wireless device 10. The first radio network node 12 may comprise a determining module 604. The processing circuitry 601 and/or the determining module 604 may be configured to determine the position of the wireless device 10.

The first radio network node 12 may be configured to receive the measurement report from the wireless device 10. The processing circuitry 601 and/or the receiving module 603 may be configured to receive the measurement report from the wireless device 10.

The first radio network node 12 may be configured to use the measurement report in the mobility procedure. The first radio network node 12 may comprise a mobility module 605. The processing circuitry 601 and/or the mobility module 605 may be configured to use the measurement report in the mobility procedure.

The first radio network node 12 may be configured to build and/or maintain the table indicating the mapping of position to beams based on the received measurement report and/or the second indication to the wireless device 10. Thus, the table may be updated based on the received second indications e.g. if position P causes triggering of beams A,D,E in the second radio network node 13, then the first radio network node 12 may learn this and update the table accordingly for position P. The first radio network node 12 may comprise a table module 606. The processing circuitry 601 and/or the table module 606 may be configured to build and/or maintain the table indicating the mapping of position to beams based on the received measurement report and/or the second indication to the wireless device 10.

The first radio network node 12 may be configured to determine the one or more neighbouring radio network nodes comprising the second radio network node 13 to be relevant for the position of the wireless device 10. The first radio network node 12 may be configured to determine the one or more neighbouring radio network nodes to be relevant for the position of the wireless device 10 by taking the table indicating the mapping of position to beams into account.

The processing circuitry 601 and/or the determining module 604 may be configured to determine the one or more neighbouring radio network nodes comprising the second radio network node 13 to be relevant for the position of the wireless device 10. The processing circuitry 601 and/or the determining module 604 may be configured to determine the one or more neighbouring radio network nodes to be relevant for the position of the wireless device 10 by taking the table indicating the mapping of position to beams into account.

The first radio network node 12 may be configured to transmit the first indication and also to transmit the beam indication indicating one or more suggested beams according to the table indicating the mapping of position to beams. The processing circuitry 601 and/or the transmitting module 602 may be configured to transmit the first indication and also to transmit the beam indication indicating one or more suggested beams according to the table indicating the mapping of position to beams.

The first radio network node 12 may be configured to receive the second indication and also to receive the further indication indicating which beams to keep and/or flush at the table indicating the mapping of position to beams at the first radio network node 12. The processing circuitry 601 and/or the receiving module 603 may be configured to receive the second indication and also to receive the further indication indicating which beams to keep and/or flush at the table indicating the mapping of position to beams at the first radio network node 12.

The methods according to the embodiments described herein for the first radio network node 12 are respectively implemented by means of e.g. a computer program 607 or a computer program product, comprising instructions, i.e., software code portions, which, when executed on at least one processor, cause the at least one processor to carry out the actions described herein, as performed by the first radio network node 12. The computer program 607 may be stored on a computer-readable storage medium 608, e.g. a disc or similar. The computer-readable storage medium 608, having stored thereon the computer program, may comprise the instructions which, when executed on at least one processor, cause the at least one processor to carry out the actions described herein, as performed by the first radio network node 12. In some embodiments, the computer-readable storage medium may be a non-transitory computer-readable storage medium.

The first radio network node 12 further comprises a memory 609. The memory comprises one or more units to be used to store data on, beams, reference signals, tables, measurement reports, positions, signal strengths, indications, application/s to perform the methods disclosed herein when being executed, and similar.

In order to perform some methods herein the second radio network node 13 is provided. FIG. 7 is a block diagram depicting the second radio network node 13 for enabling a mobility procedure of the wireless device 10 between the first radio network node 12 and the second radio network node 13 in the wireless communication network 1. The second radio network node 13 may comprise processing circuitry 701 configured to perform the methods herein.

The second radio network node 13 is configured to receive the first indication from the first radio network node 12, which first indication indicates the position of the wireless device 10. The second radio network node 13 may comprise a receiving module 702. The processing circuitry 701 and/or the receiving module 702 may be configured to receive the first indication from the first radio network node 12.

The second radio network node 13 is configured to determine the one or more beams to use based on the indicated position of the wireless device 10. The second radio network node 13 may comprise a determining module 703. The processing circuitry 701 and/or the determining module 703 may be configured to determine the one or more beams to use based on the indicated position of the wireless device 10.

The second radio network node 13 is configured to transmit the second indication to the first radio network node 12, which second indication indicates the determined one or more beams. The second radio network node 13 may comprise a transmitting module 704. The processing circuitry 701 and/or the transmitting module 704 may be configured to transmit the second indication to the first radio network node 12.

Furthermore, the second radio network node 13 may be configured to initiate transmission of the one or more beams. The processing circuitry 701 and/or the transmitting module 704 may be configured to initiate transmission of the one or more beams.

In addition, the second radio network node 13 may be configured to determine the one or more beams to use taking the table indicating the mapping of position to beams into account. The processing circuitry 701 and/or the determining module 703 may be configured to determine the one or more beams to use taking the table indicating the mapping of position to beams into account.

The second radio network node 13 may further be configured to receive the first indication and also to receive the beam indication indicating one or more suggested beams. The second radio network node 13 may also be configured to determine the one or more beams by taking this beam indication into account. The processing circuitry 701 and/or the receiving module 702 may be configured to receive the first indication and also to receive the beam indication indicating one or more suggested beams. The processing circuitry 701 and/or the determining module 703 may be configured to determine the one or more beams by taking this beam indication into account.

The second radio network node 13 may be configured to build and/or maintain the table indicating the mapping of position to beams based on the received beam indication and/or the determined one or more beams to use. The second radio network node 13 may comprise a table module 705. The processing circuitry 701 and/or the table module 705 may be configured to build and/or maintain the table indicating the mapping of position to beams based on the received beam indication and/or the determined one or more beams to use.

The second radio network node 13 may be configured to determine the one or more beams to use by taking whether a beam is active or not, and/or interference and/or signal strength of different beams into account. The processing circuitry 701 and/or the determining module 703 may be configured to determine the one or more beams to use by taking whether a beam is active or not, and/or interference and/or signal strength of different beams into account.

The second radio network node 13 may be configured to transmit the second indication and to transmit the further indication indicating which beams to keep and/or flush at the table indicating the mapping of position to beams at the first radio network node 12. The processing circuitry 701 and/or the transmitting module 704 may be configured to transmit the second indication and to transmit the further indication indicating which beams to keep and/or flush at the table indicating the mapping of position to beams at the first radio network node 12.

The methods according to the embodiments described herein for the second radio network node 13 are respectively implemented by means of e.g. a computer program 706 or a computer program product, comprising instructions, i.e., software code portions, which, when executed on at least one processor, cause the at least one processor to carry out the actions described herein, as performed by the second radio network node 13. The computer program 706 may be stored on a computer-readable storage medium 707, e.g. a disc or similar. The computer-readable storage medium 707, having stored thereon the computer program, may comprise the instructions which, when executed on at least one processor, cause the at least one processor to carry out the actions described herein, as performed by the second radio network node 13. In some embodiments, the computer-readable storage medium may be a non-transitory computer-readable storage medium.

The second radio network node 13 further comprises a memory 708. The memory comprises one or more units to be used to store data on, beams, reference signals, tables, measurement reports, positions, signal strengths, indications, application/s to perform the methods disclosed herein when being executed, and similar.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a radio network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance trade-offs inherent in these design choices.

It will be appreciated that the foregoing description and the accompanying drawings represent non-limiting examples of the methods and apparatus taught herein. As such, the inventive apparatus and techniques taught herein are not limited by the foregoing description and accompanying drawings. Instead, the embodiments herein are limited only by the following claims and their legal equivalents.

The invention claimed is:

1. A method performed by a first radio network node for enabling a mobility procedure of a wireless device between the first radio network node and a second radio network node in a wireless communication network; comprising:
   transmitting a first indication to the second radio network node, which first indication indicates a position of the wireless device;
   receiving a second indication from the second radio network node, which second indication indicates one or more beams used at the second radio network node;
   sending to the wireless device measurement information indicating the one or more beams to perform measurement on and thereby enabling the mobility procedure;
   receiving a measurement report from the wireless device;
   using the measurement report in the mobility procedure; and
   building and/or maintaining a table indicating a mapping of position to beams based on the received measurement report and/or the second indication.

2. The method according to claim 1, further comprising: determining the position of the wireless device.

3. The method according to claim 1, further comprising: determining one or more neighbouring radio network nodes comprising the second radio network node to be relevant for the position of the wireless device.

4. The method according to claim 3, wherein the determining the one or more neighbouring radio network nodes is determined taking the table indicating the mapping of position to beams into account.

5. The method according to claim 1, wherein the transmitting of the first indication further comprises transmitting a beam indication indicating one or more suggested beams according to the table indicating the mapping of position to beams.

6. The method according to claim 1, wherein the receiving of the second indication further comprises receiving a further indication indicating which beams to keep and/or flush at the table indicating the mapping of position to beams at the first radio network node.

7. A method performed by a second radio network node for enabling a mobility procedure of a wireless device between a first radio network node and the second radio network node in a wireless communication network; comprising:
   receiving a first indication from the first radio network node, which first indication indicates a position of the wireless device;
   determining one or more beams to use based on the indicated position of the wireless device and taking into account a table indicating a mapping of position to beams; and
   transmitting a second indication to the first radio network node, which second indication indicates the determined one or more beams.

8. The method according to claim 7, further comprising: initiating transmission of the one or more beams.

9. The method according to claim 7, wherein the receiving of the first indication comprises to receive a beam indication indicating one or more suggested beams and this beam indication is taken into account when determining the one or more beams.

10. The method according to claim 7, further comprising:
    building and/or maintaining the table indicating the mapping of position to beams based on the received beam indication and/or the determining of the one or more beams to use.

11. The method according to claim 7, wherein the determining the one or more beams to use is determined taking whether a beam is active or not into account.

12. The method according to claim 7, wherein the determining the one or more beams to use further takes interference and/or signal strength of different beams into account.

13. The method according to claim 7, wherein the transmitting of the second indication further comprises transmitting a further indication indicating which beams to keep and/or flush at the table indicating the mapping of position to beams at the first radio network node.

14. A first radio network node for enabling a mobility procedure of a wireless device between the first radio network node and a second radio network node in a wireless communication network; the first radio network node being configured to:
    transmit a first indication to the second radio network node, which first indication indicates a position of the wireless device;
    receive a second indication from the second radio network node, which second indication indicates one or more beams used at the second radio network node;
    send to the wireless device measurement information indicating the one or more beams to perform measurement on and thereby enabling the mobility procedure;
    receive a measurement report from the wireless device;
    use the measurement report in the mobility procedure; and
    build and/or maintain a table indicating a mapping of position to beams based on the received measurement report and/or the second indication to the wireless device.

15. The first radio network node according to claim 14, further being configured to:
    determine the position of the wireless device.

16. The first radio network node according to claim 14, further being configured to:
    determine one or more neighbouring radio network nodes comprising the second radio network node to be relevant for the position of the wireless device.

17. The first radio network node according to claim 16, being configured to determine the one or more neighbouring radio network nodes to be relevant for the position of the wireless device by taking the table indicating the mapping of position to beams into account.

18. The first radio network node according to claim 14, being configured to transmit the first indication and also to transmit a beam indication indicating one or more suggested beams according to the table indicating the mapping of position to beams.

19. The first radio network node according to claim 14, being configured to receive the second indication and also to receive a further indication indicating which beams to keep and/or flush at the table indicating the mapping of position to beams at the first radio network node.

20. A second radio network node for enabling a mobility procedure of a wireless device between a first radio network node and the second radio network node in a wireless communication network; the second radio network node being configured to:
- receive a first indication from the first radio network node, which first indication indicates a position of the wireless device;
- determine one or more beams to use based on the indicated position of the wireless device and taking into account a table indicating a mapping of position to beams; and
- transmit a second indication to the first radio network node, which second indication indicates the determined one or more beams.

21. The second radio network node according to claim 20, further being configured to initiate transmission of the one or more beams.

22. The second radio network node according to claim 20, being configured to receive the first indication and also to receive a beam indication indicating one or more suggested beams and further being configured to determine the one or more beams by taking this beam indication into account.

23. The second radio network node according to claim 20, being configured to build and/or maintain the table indicating the mapping of position to beams based on the received beam indication and/or the determining of the one or more beams to use.

24. The second radio network node according to claim 20, being configured to determine the one or more beams to use by taking whether a beam is active or not into account.

25. The second radio network node according to claim 20, being configured to determine the one or more beams to use by taking interference and/or signal strength of different beams into account.

26. The second radio network node according to claim 20, being configured to transmit the second indication and to transmit a further indication indicating which beams to keep and/or flush at the table indicating the mapping of position to beams at the first radio network node.

* * * * *